United States Patent [19]

Tanagawa

[11] Patent Number: 5,117,380
[45] Date of Patent: May 26, 1992

[54] RANDOM NUMBER GENERATOR DRIVEN BY INDEPENDENT CLOCK PULSES ASYNCHRONOUSLY WITH SYSTEM CLOCK PULSES

[75] Inventor: Kouji Tanagawa, Tokyo, Japan

[73] Assignee: Oki Electric Industry Co., Ltd., Tokyo, Japan

[21] Appl. No.: 701,375

[22] Filed: May 13, 1991

Related U.S. Application Data

[63] Continuation of Ser. No. 491,068, Mar. 9, 1990, abandoned.

[30] Foreign Application Priority Data

Mar. 15, 1989 [JP] Japan ............................ 1-62562

[51] Int. Cl.$^5$ .............................................. G06F 7/38
[52] U.S. Cl. ...................................................... 364/717
[58] Field of Search ............... 364/717, 717.5; 331/78

[56] References Cited

U.S. PATENT DOCUMENTS

| | | | |
|---|---|---|---|
| 3,614,399 | 10/1971 | Linz | 364/717 |
| 3,777,278 | 12/1973 | Majeau et al. | 364/717 X |
| 3,811,038 | 5/1974 | Reddaway | 364/717 |
| 4,665,502 | 5/1987 | Kreisner | 364/900 |
| 4,667,301 | 5/1987 | Chiu et al. | 364/717 |
| 4,776,012 | 10/1988 | Zscheile, Jr. et al. | 364/717 X |
| 4,811,247 | 3/1989 | Malady et al. | 364/717 X |

FOREIGN PATENT DOCUMENTS

| | | |
|---|---|---|
| 2375824 | 7/1978 | France . |
| 53-17044 | 2/1978 | Japan . |
| 54-41036 | 3/1979 | Japan . |
| 56-157535 | 12/1981 | Japan . |
| 54-36344 | 2/1982 | Japan . |
| 61-163435 | 7/1986 | Japan . |
| 62-091039 | 4/1987 | Japan . |

OTHER PUBLICATIONS

IBM Technical Disclosure Bulletin, vol. 28, No. 6, Nov. 1985, pp. 2303-2304.

*Primary Examiner*—Tan V. Mai
*Attorney, Agent, or Firm*—Spencer & Frank

[57] ABSTRACT

A random number generator built into an integrated circuit has at least one oscillator that generates clock pulses independent of the integrated circuit's system clock, at least two counters for counting those clock pulses, and read-out means for outputting the contents of the counters in response to a read signal. The random number generator accordingly has an extremely simple circuit configuration, but is capable of generating random numbers at a rapid rate.

3 Claims, 3 Drawing Sheets

RANDOM NUMBER GENERATOR DRIVEN BY INDEPENDENT CLOCK PULSES ASYNCHRONOUSLY WITH SYSTEM CLOCK PULSES This application is a continuation application of Ser. No. 07/491,068, filed Mar. 9, 1990, now abandoned.

BACKGROUND OF THE INVENTION

Many integrated circuits such as single-chip microcomputers require built-in random number generators for purposes such as coding and decoding data. In many cases very large random numbers are required, comprising many digits or bits, which must be assembled from a series of successively generated random numbers. A random number generator should therefore be capable of generating successive random numbers quickly, but it should not require extensive circuitry, since space in an integrated circuit is limited.

One prior-art random number generator comprises an arithmetic unit that repetitively performs certain arithmetic operations, the results of which are kept in a decimal counter. Random numbers are requested by key input by a human operator. When such input occurs, the arithmetic operations are halted and the current counter contents are output as a random number. This random number generator, however, requires extensive counter and arithmetic circuitry, and needs several seconds to generate a random number with a large number of digits.

Another prior-art random number generator uses logic gates and an M-series pseudo-random number generator, for example, to generate a group of clock pulses with differing pulse counts. The clock pulses are counted by a counter, and the counter output is used as a pseudo-random number. This random number generator, however, also requires extensive circuitry and cannot generate random numbers at a rapid rate.

Yet another prior-art random number generator uses a plurality of small-capacity read-only memories from which data are read at independent cycles, and generates long-period pseudo-random numbers by performing arithmetic operations on the data read from the read-only memories. This random number generator, however, is limited in speed by the time needed for performing the arithmetic operations, and requires extensive memory circuitry if it is to generate large random numbers.

SUMMARY OF THE INVENTION

An object of the present invention is accordingly to generate successive random numbers quickly.

Another object is to generate random numbers with simple circuitry.

The above and other objects are accomplished according to the invention by the provision of a random number generator, built into an integrated circuit driven by a system clock, comprising at least one oscillator for generating clock pulses independent of the system clock, at least two counters for counting those clock pulses, and read-out means for outputting contents of the counters in response to a read signal.

DETAILED DESCRIPTION OF THE EMBODIMENTS

Two random number generators embodying the present invention will be described with reference to FIGS. 1 and 3. Both random number generators are shown as delivering 16-bit random numbers to a system bus in an integrated circuit such as a single-chip microcomputer, in which most, if not all of the elements of the random number generator. The integrated circuit is driven by a system clock 10, and requests random numbers by driving a read signal to the high (active) state at times controlled, for example, by a microcomputer application program.

Figure 1:
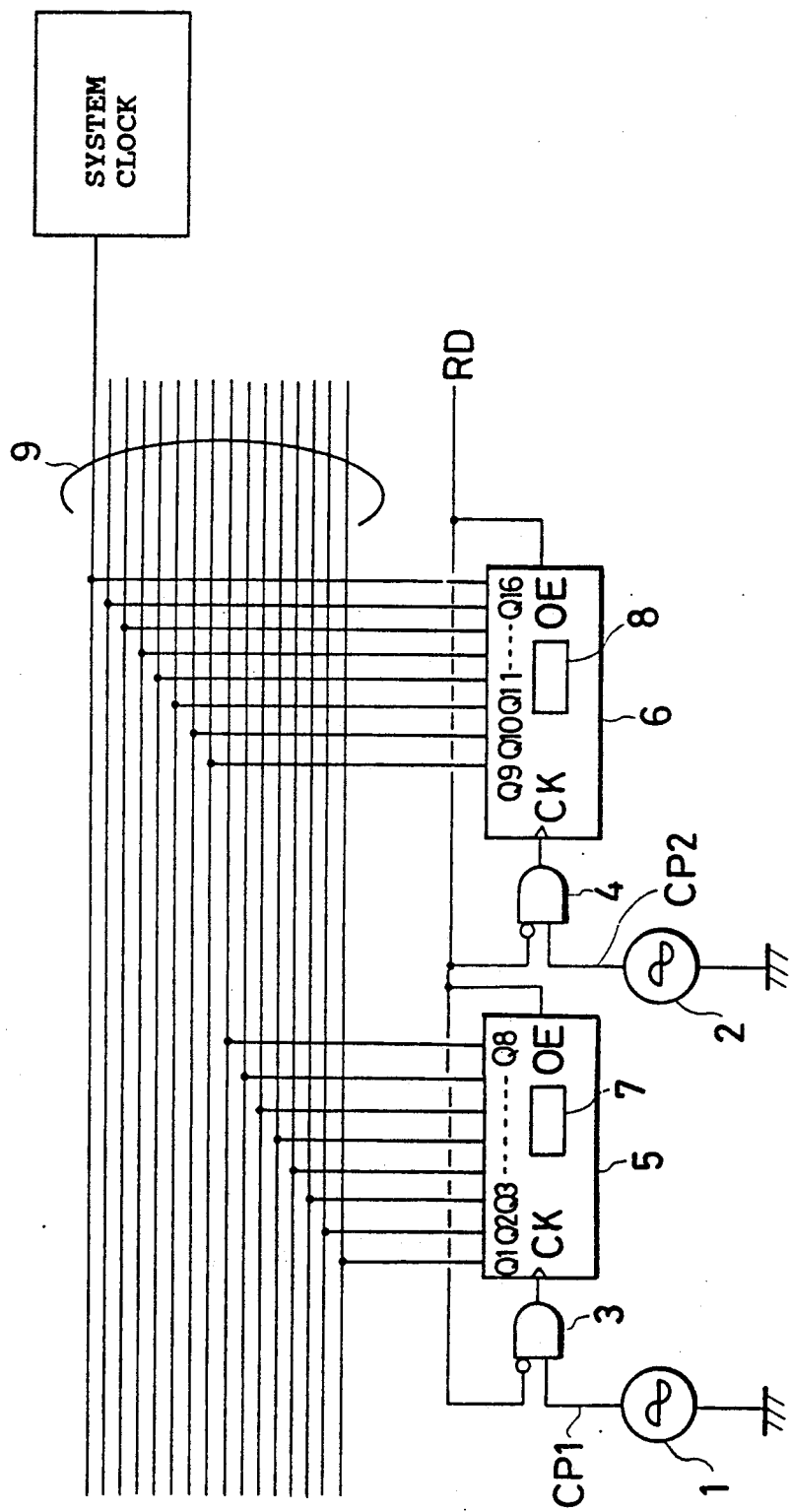
FIG. 1 is a schematic diagram illustrating a novel random number generator according to one embodiment of the invention.

The random number generator shown in FIG. 1 is provided with a pair of oscillators 1 and 2, which may be RC oscillators or crystal oscillators, for generating clock pulses CP1 and CP2. When crystal oscillators are employed, the crystals (quartz) are provided outside of the integrated circuit and connected to the integrated circuit. The clock pulses CP1 and CP2 are mutually independent, meaning that they are asynchronous, and both are independent of the system clock.

The clock pulses CP1 and CP2 are gated by AND gates 3 and 4 and counted by a pair of counters 5 and 6. More specifically, the AND gate 3 receives the clock pulses CP1 and the inverse of the read signal (RD) as inputs, performs a logical AND operation on these inputs, and provides the result as output to the clock (CK) terminal of the counter 5. Similarly, the AND gate 4 ANDs the clock pulses CP2 with the inverse of the read signal and provides the result to the clock terminal of the counter 6. The counters 5 and 6 count the pulses received at their clock terminals.

The counters 5 and 6 in FIG. 1 are eight-bit up-counters, the contents of which are output at output terminals Q1, Q2, ..., Q8 and Q9, Q10, ..., Q16, respectively. The counter 5 includes a read-out control circuit 7 which outputs the counter contents at Q1 to Q8 only when a high signal is received at an output enable (OE) terminal, to which the read signal is connected. When the read signal is low, Q1 to Q8 are kept in the high-impedance state. The counter 6 includes a similar read-out control circuit 8 that outputs Q9 to Q16 only when a high read signal is received.

The output terminals Q1 to 16 are connected to a 16-bit system bus 9 which carries the outputs Q1 to Q16 to other parts of the integrated circuit, such as memory and controller circuits not shown in the drawing.

The operation of this random number generator will be explained with reference to FIGS. 1 and 2.

When the integrated circuit is powered up, the counters 5 and 6 are reset to zero, the read signal is reset to the low (inactive) state and power is supplied to the oscillators 1 and 2, which begin generating clock pulses CP1 and CP2. Since the read signal is low, its inverse is high, so the clock pulses CP1 and CP2 are passed unchanged through the AND gates 3 and 4 to the counters 5 and 6 which begin counting them.

Figure 2:
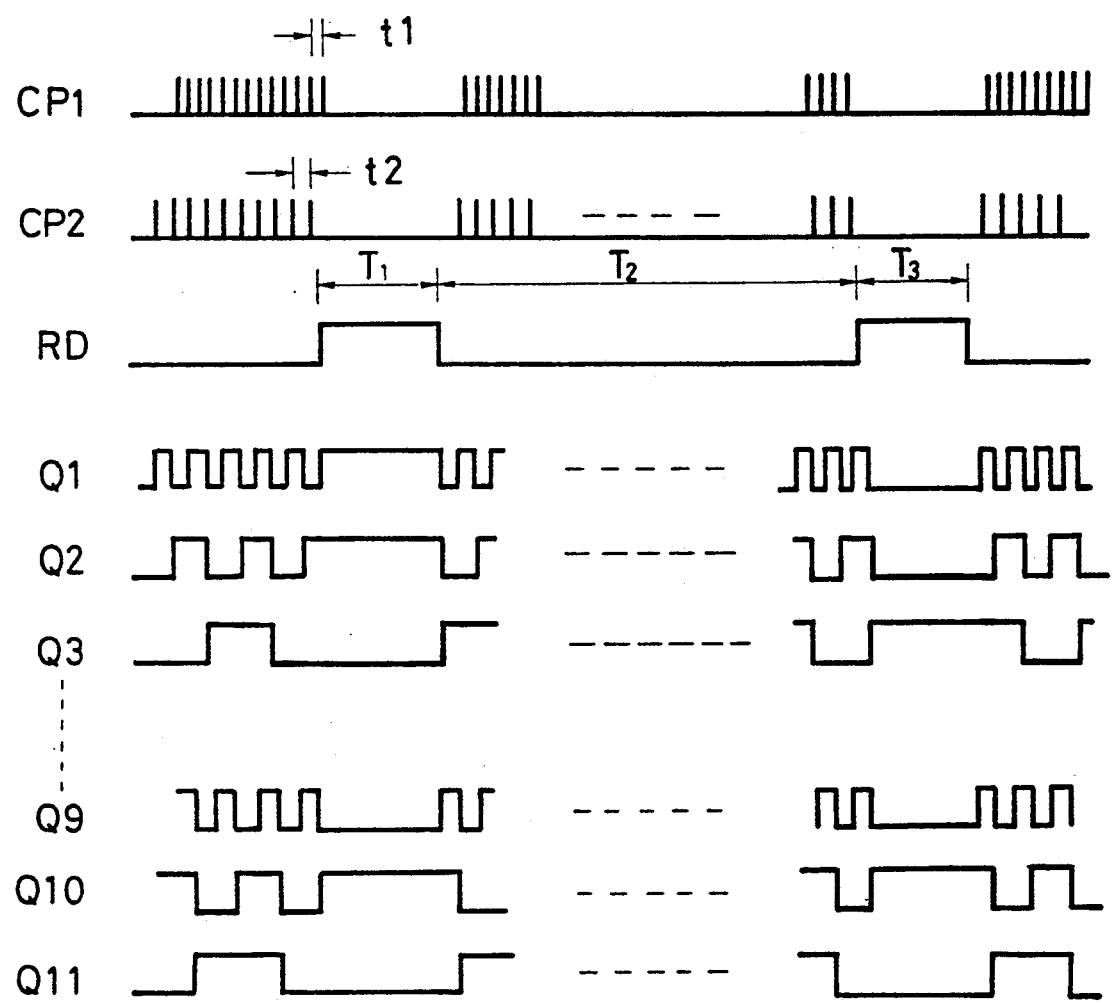
FIG. 2 is a timing chart illustrating the operation of the random number generator in FIG. 1.

With reference to FIG. 2, the oscillators 1 and 2 may run at different rates. For example, oscillator 1 may run faster than oscillator 2, as illustrated at the top of FIG. 2, causing counter 5 to count faster than counter 6.

Even if the oscillators 1 and 2 run at substantially the same rate, due to natural differences between component characteristics they will not run at exactly the same rate, nor will they run with perfect regularity, so they will quickly get out of step; hence the contents of the counters 5 and 6 will quickly become mutually unrelated.

When a random number is required, the read signal is driven high for an interval T1 in FIG. 2. During this interval the inverse of the read signal is low, so the outputs of the AND gates 3 and 4 remain low and the counters 5 and 6 stop counting. In addition, the output enable (OE) inputs of the counters 5 and 6 are high, so the read-out control circuits 7 and 8 output the counter contents Q1 to Q16 to the system bus 9. Since the counters 5 and 6 operate independently of each other and of the system clock, the value output from Q1 to Q16 is in effect a random number.

When the read signal is driven low again, the outputs Q1 to Q16 go to the high-impedance state and the counters 5 and 6 resume counting. When another random number is required, after the interval T2 in FIG. 2, the read signal again goes high, the counters 5 and 6 again stop, and their contents Q1 to Q16 are again output to the system bus. This output continues for the interval T3 during which the read signal is high.

If the interval T2 is sufficiently long, due to the independent counting rates of the counters 5 and 6 there will be no discernible relation between the first random number output during the interval T1 and the second random number output during the interval T3; the numbers, that is, will indeed be random. By continuing in the same way, a non-repeating series comprising any necessary number of random numbers can be generated.

To give the counters adequate time to get out of step, the minimum interval T2 between successive random numbers should preferably be an order of magnitude larger than the time required by the counters 5 and 6 to complete one counting cycle. In FIG. 1, the counters are eight-bit counters so a complete counting cycle comprises values from 0 to 255. If the intervals t1 and t2 between successive clock pulses CP1 and CP2 are on the order of 200 ns, for example, a complete counting cycle takes approximately $256 \times 200$ ns=51.2 $\mu$s, so random numbers can be generated at intervals of about 0.5 ms, which is much faster than in the prior art.

Furthermore, the circuitry required to generate the random numbers is extremely simple, comprising only a pair of oscillators, a pair of AND gates, and a pair of counters. This random number generator can accordingly be used as part of an integrated circuit without taking up excessive space.

If the counters 5 and 6 are not initialized to zero but have unpredictable values at power-up, the structure of the random generator can be further simplified by using just one oscillator. Such a random number generator will be described next with reference to FIG. 3.

Figure 3:
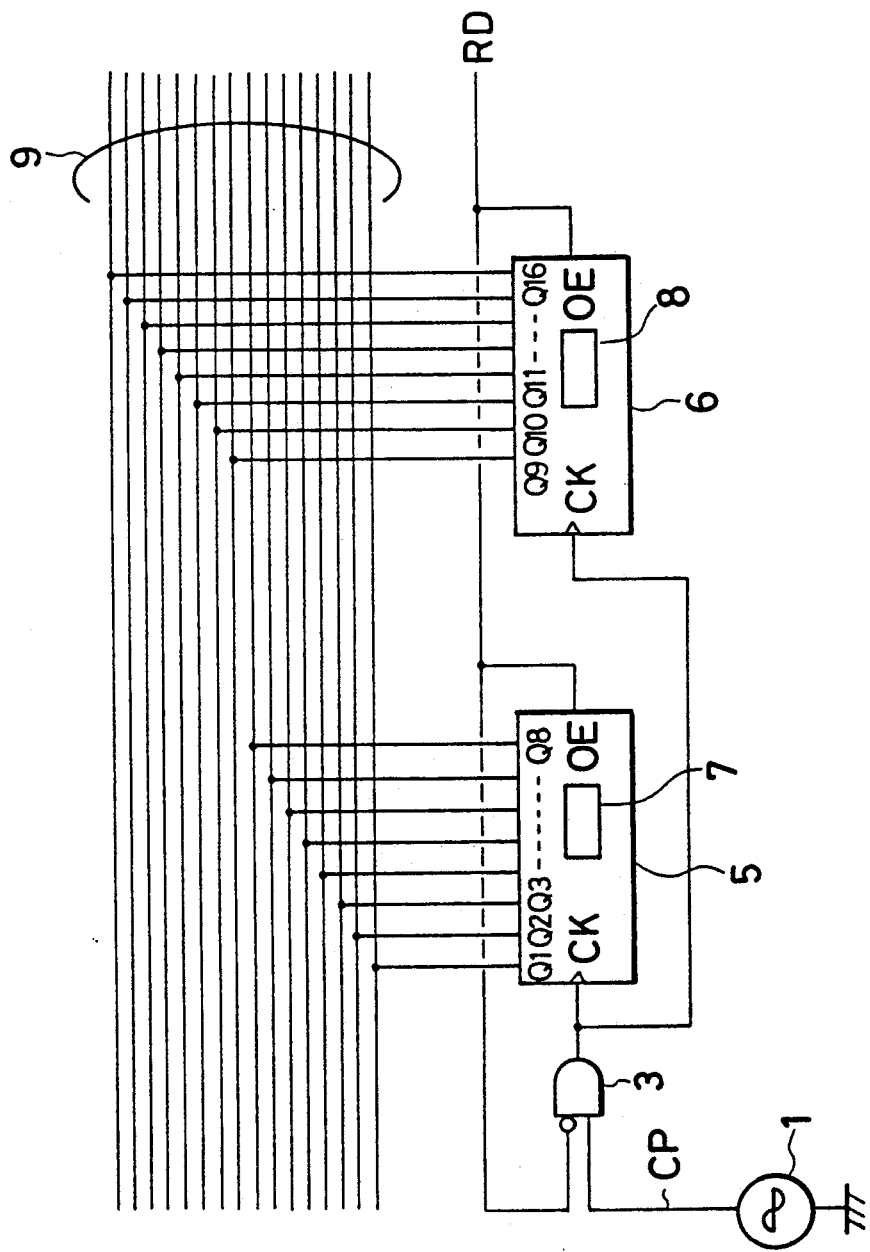
FIG. 3 is a schematic diagram illustrating another embodiment of the novel random number generator according to one embodiment of the invention.

The random number generator in FIG. 3 comprises the same oscillator 1, AND gate 3, and counters 5 and 6 as the random number generator in FIG. 1, but the counters 5 and 6 have unpredictable contents at power-up. The output of the AND gate 3 is connected to the clock terminals of both the counters 5 and 6. The operation of this random number generator is similar to the operation of the random number generator in FIG. 1, except that both counters 5 and 6 count clock pulses CP1 from the oscillator 1. Both counters thus count at the same rate, but since their contents are unpredictable at power-up and hence unrelated to begin with, the outputs Q1 to Q16 can again be used as random numbers.

The scope of this invention is not limited to the structures shown in the drawings, but includes various modifications and variations that will be apparent to one skilled in the art. In particular, the random number generator may have more than two counters, and the counters need not be eight-bit counters. Thirty-two bit random numbers, for example, can be generated using four eight-bit counters, or two sixteen-bit counters. When more than two counters are used, each counter can have its own oscillator as in FIG. 1, or if the counters are not initialized at power-up, they may share the same oscillator as in FIG. 2. The counters may be up-counters or down-counters, or a mixture of both types.

The read-out means need not be structured as in FIGS. 1 and 3; for example, it may comprise a circuit for capturing the counter contents into a register, making it unnecessary to stop the counters during random number output.

What is claimed is:

1. An integrated circuit including a system clock for producing clock pulses for driving said integrated circuit and a random number generator built into said integrated circuit for generating random numbers in response to a read signal, said random number generator comprising:

at least two oscillators for generating respective independent clock pulse signals each having clock pulses which are asynchronous with respect to the clock pulses of the system clock of said integrated circuit and with respect to the clock pulses the other of said at least two oscillators;

at least two counters each connected to a respective one of said at least two oscillators for respectively counting the clock pulses of said at least two oscillators; and read-out means connected for reading out the contents of said at least two counters in parallel in response to the read signal, the contents read out of said at least two counters constituting a random number.

2. The integrated circuit of claim 1, wherein said read-out means includes means for causing said at least two counters to stop counting the clock pulses of said at least two oscillators when the contents of said at least two counters are read out.

3. The integrated circuit of claim 2, further comprising a plurality of AND gates each connected between a respective one of said at least two oscillators and a respective one of said at least two counters for gating the clock pulses generated by said at least two oscillators in response to the read signal; and a read-out control circuit disposed in each of said at least two counters for reading out the contents of the respective counters in response to the read signal.

* * * * *